(12) United States Patent
Takeuchi (10) Patent No.: US 10,567,601 B2
(45) Date of Patent: Feb. 18, 2020

(54) DISPLAY DEVICE, DISPLAY METHOD, AND RECORDING MEDIUM FOR DISPLAYING TEMPLATE

(71) Applicant: SEIKO EPSON CORPORATION, Tokyo (JP)

(72) Inventor: Takeshi Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/157,240

(22) Filed: Oct. 11, 2018

(65) Prior Publication Data

US 2019/0116273 A1 Apr. 18, 2019

(30) Foreign Application Priority Data

Oct. 13, 2017 (JP) .................... 2017-199692

(51) Int. Cl.
*H04N 21/85* (2011.01)
*H04N 1/00* (2006.01)

(52) U.S. Cl.
CPC .................. *H04N 1/0044* (2013.01)

(58) Field of Classification Search
CPC ............. H04N 1/0044; H04N 1/00456
USPC ........................ 358/1.18; 715/246
See application file for complete search history.

(56) References Cited

U.S. PATENT DOCUMENTS

| 2003/0084055 | A1* | 5/2003 | Tanaka | G06F 17/248 |
| 2005/0278625 | A1* | 12/2005 | Wessling | G06F 17/248 715/273 |
| 2010/0164992 | A1 | 7/2010 | Akiya | |
| 2011/0025714 | A1* | 2/2011 | Ptucha | G06F 16/5838 345/641 |
| 2015/0086116 | A1* | 3/2015 | Yamaji | G06K 9/00684 382/190 |

FOREIGN PATENT DOCUMENTS

WO 2008/117827 A1 10/2008

* cited by examiner

*Primary Examiner* — Jamares Q Washington
(74) *Attorney, Agent, or Firm* — Global IP Counselors, LLP (57) ABSTRACT

A display device includes an image selection unit that selects an image to be processed, a storage unit that stores a plurality of templates including an arrangement area on which the image is arranged, a template selection unit that selects a first template and a second template from the plurality of templates based on the selected image, an arrangement unit that arranges the selected image on the arrangement area of the first template and arranges the selected image on the arrangement area of the second template, and a display control unit that causes a display unit to display the first template after the arrangement of the image and the second template after the arrangement of the image.

9 Claims, 8 Drawing Sheets

DISPLAY DEVICE, DISPLAY METHOD, AND RECORDING MEDIUM FOR DISPLAYING TEMPLATE

BACKGROUND

1. Technical Field

The present invention relates to a device and a method for displaying a template and a recording medium for storing a program.

2. Related Art

An image display device including a storage unit of storing a plurality of templates for image arrangement including at least one of a vertically long image arrangement area and a horizontally long image arrangement area, an arrangement number setting unit of setting the number of image (arrangement number) to be arranged in the template for the image arrangement, an image selection unit of selecting an arrangement target image from captured image captured in advance, a determination unit of determining whether a direction of the arrangement target image is a vertically long direction or a horizontally long direction, a template selection unit of selecting the template for the image arrangement from the plurality of templates for the image arrangement stored in the storage unit based on the arrangement number to be set and a determination result by the determination unit, a creation unit of creating a display image by arranging an arrangement target image in an image arrangement area within a target template selected by the template selection unit, and a display control unit of displaying the display image on a display device, is known (JP-T-2008-117827).

A user sometimes wants to check the preview image of various templates in which a selected image is arranged and to select the template matching the selected image. In such a case, the user needs to perform an operation of switching the templates one by one and viewing the template, and takes much time and effort required for selecting the template that matches the selected image. In JP-T-2008-117827, a layout (one preview as a whole in which part of image selected by user is placed on left page template and remaining images selected by user is placed on the right page template, see FIG. 12 in JP-T-2008-117827) of two pages of an album and does not solve the above-described problem, is described.

SUMMARY

An advantage of some aspects of the invention is to provide a display device, a display method, and a recording medium for storing a display program which can contribute an easy selection of an appropriate template.

According to an aspect of the invention, a display device includes an image selection unit that selects an image to be processed, a storage unit that stores a plurality of templates including an arrangement area on which the image is arranged, a template selection unit that selects a first template and a second template from the plurality of templates based on the selected image, an arrangement unit that arranges the selected image on the arrangement area of the first template and arranges the selected image on the arrangement area of the second template, and a display control unit that causes a display unit to display the first template after the arrangement of the image and the second template after the arrangement of the image.

According to the configuration, the display device selects the plurality of templates for arranging images from the storage unit based on the selected image. Then, the selected image is arranged in each template of the plurality of the selected templates (first template and second template), and the plurality of templates (first template and second template) of the arrangement of the image are displayed on a display unit. With this, the user can compare the plurality of different templates on which a selected common image is arranged on the display unit, and can easily select the template (determined that it is appropriate by user) by arranging the selected image.

In the display device, the template selection unit may select the first template and the second template from the plurality of templates based on feature information of the image including at least one of the capture date and time and the capture location of the selected image.

According to the configuration, the display device automatically selects the plurality of templates corresponding to the arrangement of the selected image among the plurality of templates stored, based on the feature information such as the capture date and time and the capture location of the selected image.

In the display device, the template selection unit may specify one or more main images from the selected images based on the feature information for each image, and select the first template and the second template from the plurality of templates based on the main image.

According to the configuration, even in a case where there is a variation in the feature information for each selected image, the display device specifies the main image from the selected images such that the plurality of templates corresponding to the arrangement of the main image can be automatically selected from the plurality of templates stored.

In the display device, the arrangement unit may set a plurality of pages in each of the selected templates and arrange the selected image to be divided into the plurality of pages for each of the selected templates, and the display control unit may cause the display unit to display each of the selected templates in a state where parts of the plurality of pages after the arrangement of the image are overlapped.

According to the configuration, even when the number of the selected image is great, and the entirety of the selected image on the arrangement area for each template is not arranged, by increasing the template to the plurality of pages, it is possible to appropriately present the template after the image arrangement to the user.

In the display device, the display control unit may cause the display unit to display the template selected by a user from the templates after the arrangement of the image displayed on the display unit, in a size greater than that of other templates.

According to the configuration, it is possible to present the template selected by the user among the templates after the image arrangement displayed on the display unit, to the user in a more easily viewable state.

The display device may further include a print control unit that transmits the template selected by the user from the templates after the arrangement of the image displayed on the display unit to a print unit and causes the print unit to print the template.

According to the configuration, the user can compare the plurality of different templates on which the selected common image is arranged on the display unit, and can easily obtain a print result of the template (template of after arrangement of image) selected among the templates.

The technical idea of the invention can also be realized by a device other than a display device. For example, a method (display method) including a process performed by each unit of the display device and a program (display program) for causing a computer to perform the method are also established as the invention. Of course, a computer-readable storage medium for storing the program is also established as the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. Note that each drawing is merely an example for explaining this embodiment.

1. Outline Explanation of Device Configuration

Figure 1:
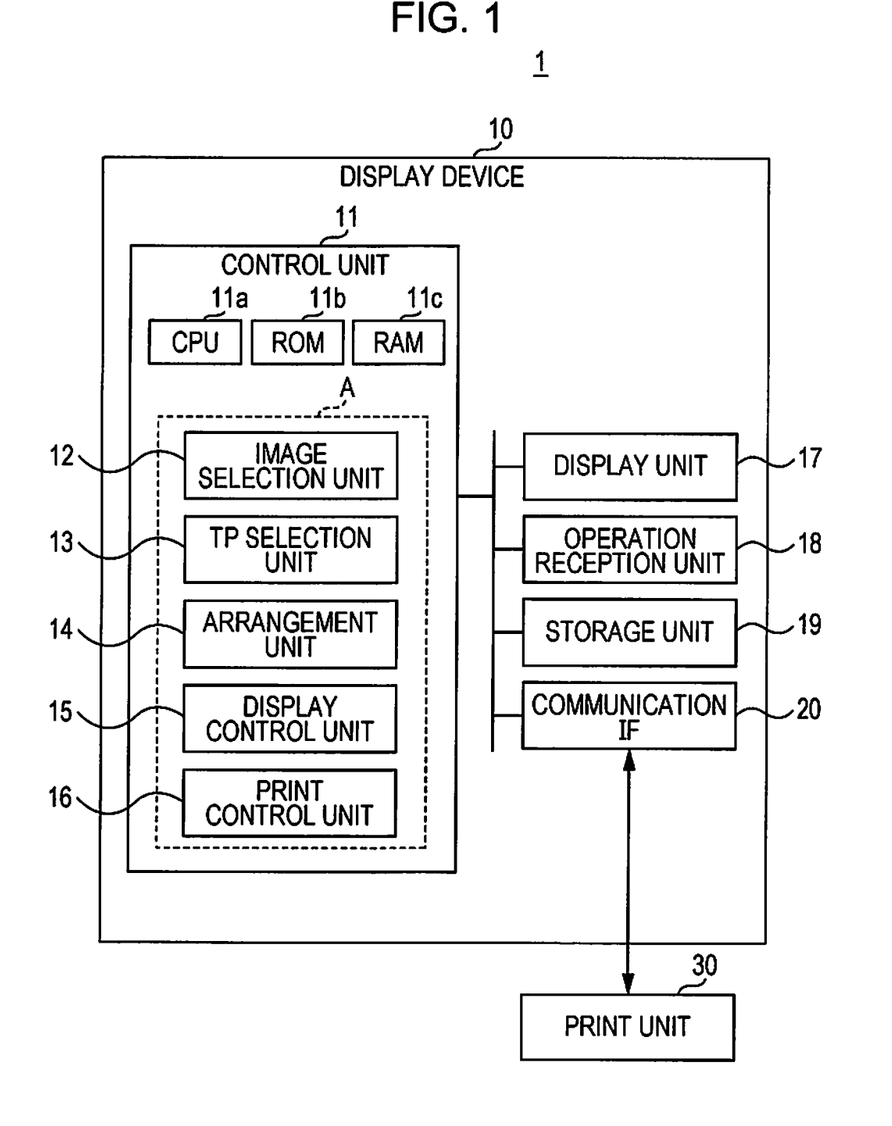
FIG. 1 is a diagram simply illustrating a device configuration.

FIG. 1 simply illustrates a device configuration according to the present embodiment. For example, a display device 10 includes a control unit 11, a display unit 17, an operation receiving unit 18, a storage unit 19, a communication interface (IF) 20, and the like. For example, the display device 10 is realized by a personal computer (PC) or an information processing device having the same process function as the PC. Since the display device 10 controls display by the display unit 17, it may be referred to as a display control device. In addition, since the display device 10 controls printing by a print unit 30, it may be referred to as a print control device. In addition, since the display device 10 performs an image process for displaying a template, it may be referred to as an image process device.

The control unit 11 is configured to appropriately include one or a plurality of ICs including a CPU 11a, a ROM 11b, a RAM 11c, and the like or another memory and the like. In the control unit 11, the CPU 11a performs an arithmetic process according to a program stored in the ROM 11b or the like by using the RAM 11c or the like as a work area such that an operation of the display device 10 is controlled. A program A is mounted on the control unit 11, and realizes each function of an image selection unit 12, a template (TP) selection unit 13, an arrangement unit 14, a display control unit 15, a print control unit 16, and the like according to the program A. The program A can be referred to as a display (control) program, a print control program, an image process program, and the like. It can be mentioned that the control unit 11 performs a process according to the program A (part of program A) such that a display method according to the invention is realized.

The communication IF 20 is a generic name of an IF for which the control unit 11 performs communication with the outside of the display device 10 in accordance with a predetermined communication standard. For example, the storage unit 19 is configured with a storage medium such as a hard disk drive (HDD) and a flash memory.

The display unit 17 is a unit for displaying visual information, and configured with, for example, a liquid crystal display (LCD), an organic EL display, or the. A configuration may be adopted in which the display unit 17 includes a display and a driving circuit for driving the display. The operation receiving unit 18 is a unit for receiving an operation by the user, and realized by, for example, a physical button, a touch panel, a mouse, a keyboard, or the like. Of course, the touch panel may be realized as one function of the display unit 17. In addition, the touch panel including the display unit 17 and the operation receiving unit 18 can be referred to as an operation panel or the like. The display unit 17 and the operation receiving unit 18 may be a part of the display device 10, or may be a peripheral device externally attached to the display device 10.

The display device 10 is communicably connected to the print unit 30 via the communication IF 20. The print unit 30 is a mechanism capable of performing printing based on print data transmitted from the display device 10 (control unit 11), and can be referred to as a print device. A print method adopted by the print unit 30 is not particularly limited, and there are various methods such as an ink jet method and an electrophotographic method. In addition, the print unit 30 has at least a print function and may be a multifunctional machine having a plurality of functions such as a scanner and a facsimile in addition to the print function. A configuration including the display device 10 and the print unit 30 can be referred to as a print system 1.

Although each of the display device 10 and the print unit 30 is an independent device, and the entirety of they may be included in one device as an embodiment. In a case where the display device 10 and the print unit 30 are included in one device, a configuration (one device) including the display device 10 and the print unit 30, can be referred to as the print device 1. That is, the print device 1 may be adopted as the display device according to the invention, as one function thereof.

2. Template Display Process

Figure 2:
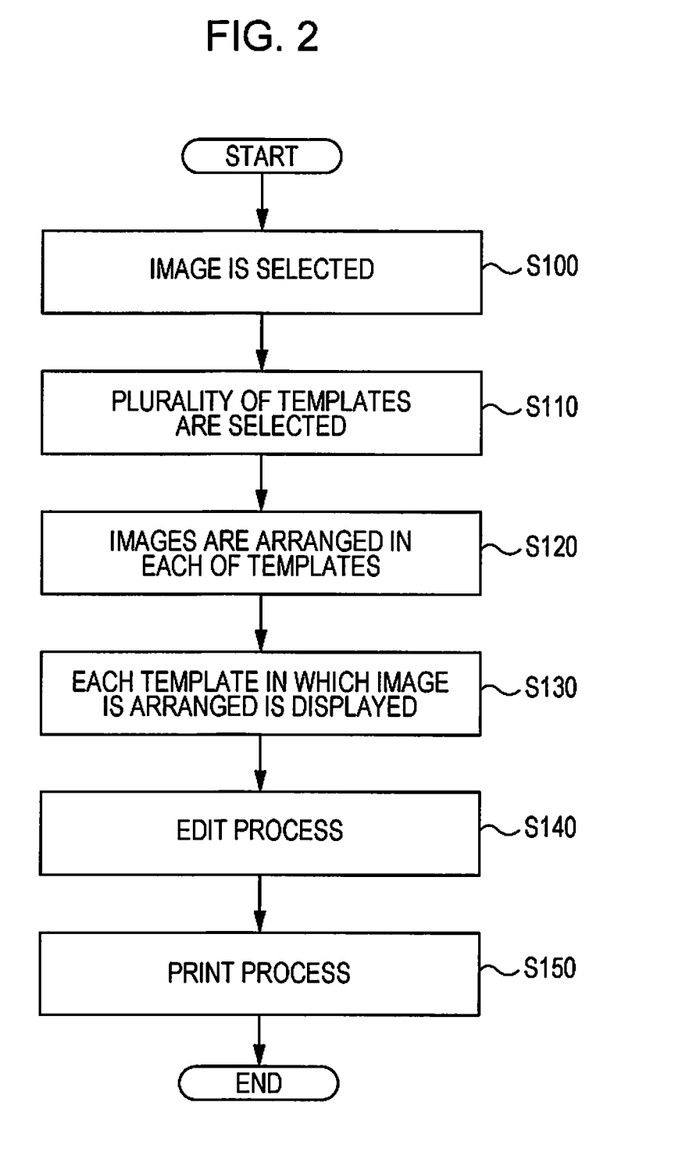
FIG. 2 is a flowchart illustrating a process performed by a control unit according to a program.

FIG. 2 illustrates a process performed by the control unit 11 according to the program A by using a flowchart.

The control unit 11 (image selection unit 12) selects an image to be processed (image selection process, step S100). The image to be processed is an image (image data) displayed by arranging it on the template (which will be described below), or printed in a state where it is arranged on the template. Here, the image selection unit 12 selects an image according to an operation of the user.

Figure 3:
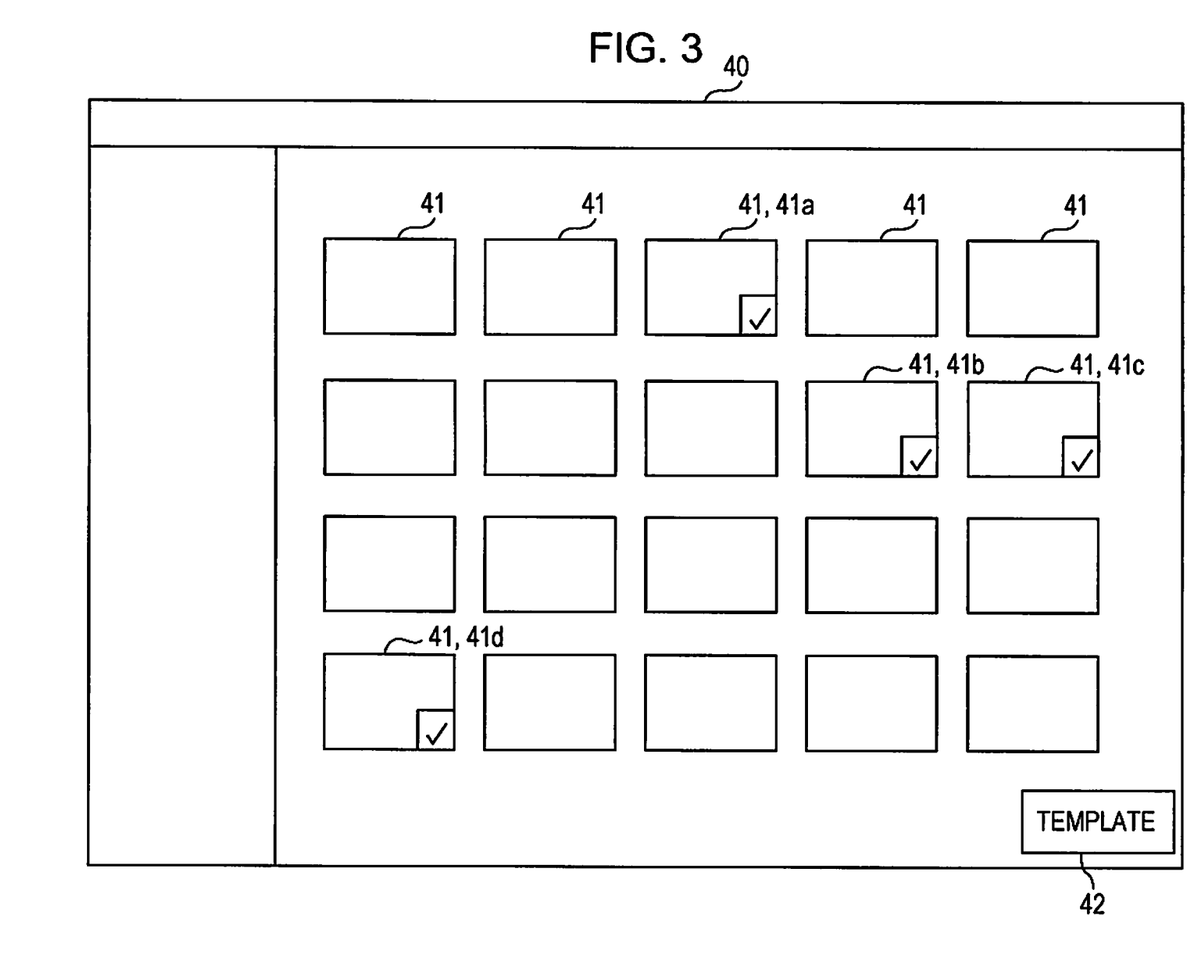
FIG. 3 is a diagram illustrating an example of an image selection screen.

FIG. 3 illustrates an example of an image selection screen 40 for receiving the selection of an image by the user. The image selection unit 12 reads reduced images (thumbnail) 41 of the images from a storage source in which an image can be stored as a process target, and displays the image selection screen 40 on which a plurality of the reduced images 41 are arranged on the display unit 17. The storage source of the image can be processed as the process target is various such as the storage medium (for example, storage unit 19) built in the display device 10, the storage medium connected to the display device 10 from outside, and the like. The user operates the operation receiving unit 18 such that one or more arbitrary reduced image 41 can be selected in the image selection screen 40. The image selection unit 12 selects an image according to the operation of such a user (selection of image by user is received).

An image selected by the image selection unit 12 in step S100 is referred to as a "target image". When referring an example of FIG. 3, it is assumed that four reduced images 41 (41a, 41b, 41c, and 41d) are selected by the user in the image selection screen 40, in step S100. Needless to say, the reduced images 41a, 41b, 41c, and 41d themselves are not the target image and each image stored in the storage source (for example, storage unit 19) indicated by each of the reduced images 41a, 41b, 41c, and 41d is the target image. However, here, based on the easiness of reference when referring to FIG. 3, an image selected in step S100 is represented as the target images 41 (41a, 41b, 41c, and 41d). In a state where one or more images (for example, target images 41a, 41b, 41c, and 41d) are selected in the image selection screen 40, in a case where the user operates a predetermined button (template display button) 42 provided in the image selection screen 40, the control unit 11 advances a process from step S100 to step S110.

In step S110, the control unit 11 (TP selection unit 13) selects a plurality of templates from the plurality of templates stored in the storage unit 19 based on the target image (template selection process). The template is a previously designed image having blank spaces (arrangement area) and the like for arranging images such as photographs, and is also called a frame or the like. For example, in each template, various designs such as patterns, illustrations, characters, stamps, messages, and the like relating to seasons, landscapes, events, and the like are given. In step S110, the TP selection unit 13 selects a plurality of templates, that is, at least two or more templates from the plurality of stored templates. Therefore, any one of the templates selected in step S110 can be referred to as the first template and any one of the templates selected in step S110 other than the first template can be referred to as the second template. The first template and the second template are merely expressions for distinguishing the plurality of templates selected in step S110. The third, the fourth, . . . templates may be included in the plurality of templates selected in step S110.

Several methods of selecting the template by the TP selection unit 13 will be specifically described.

As a premise, the TP selection unit 13 selects a template having the arrangement area corresponding to the number of target image selected by the image selection unit 12 in step S100. As the above-described example, in a case where four target images 41a, 41b, 41c, and 41d are selected in step S100, the TP selection unit 13 selects the template having the four arrangement areas. In this case, the TP selection unit 13 selects the template based on feature information of the target image. For example, the feature information of the target image is the capture date and time or the capture location of the target image. Various types of information such as a capture date by a digital still camera is described in the so-called exchangeable image file format (EXIF) information or the like attached to the target image, and the information of the capture date and time or the capture location (longitude, latitude, altitude, or the like) by a global positioning system (GPS) may be included in them in some cases.

As an example, when the capture date and time as the feature information of the target image indicate a period of from March to April and the capture location as the feature information of the target image indicates Japan, the TP selection unit 13 can extract (select) a plurality of templates of designs corresponding to Japanese spring scenery and events such as cherry blossoms, cherry blossom viewing, graduation ceremonies, entrance ceremonies, or the like from the templates stored in the storage unit 19. The feature information (template feature information) indicating the design feature and the number of the arrangement area of each template is also attached to a stored template side. Therefore, the TP selection unit 13 automatically selects a suitable template from the number of the target image and the feature information with reference to the template feature information for each template.

In addition, as an example, when the capture location as the feature information of the target image indicates a tourist spot (for example, France), the TP selection unit 13 can select the plurality of templates of designs imitating representative landscapes and buildings in the tourist spot among the templates stored in the storage unit 19.

In addition, as an example, when it can be determined that an image is captured at night from the capture date and time as the feature information of the target image, the TP selection unit 13 can select the plurality of templates of a predetermined design suitable for arranging a night scene image from the templates stored in the storage unit 19. In any case of the present embodiment, it can be mentioned that a configuration in which the TP selection unit 13 selects the first template and the second template from the plurality of the stored templates based on the feature information including one of the capture date and time and the capture location of the target image, is one of disclosure contents.

The feature information of the target image is not limited to the capture date and time or the capture location. For example, the TP selection unit 13 can select a plurality of appropriate templates according to modes from the templates stored in the storage unit 19 by extracting the mode (night view capturing mode, indoor capturing mode, or the like) at the time of capturing from EXIF information of the target image. In addition, for example, the TP selection unit 13 can perform a so-called human (face) recognition and set a result of the face recognition as the feature information (success/failure of face detection) of the target image by analyzing the target image. For example, when the face can be detected according to the result of the face recognition for the target image, the TP selection unit 13 can select the plurality of templates of a predetermined design suitable for arranging a portrait from the templates stored in the storage unit 19.

The feature information of each target image is not necessarily unified. For example, there may be variations in the capture date and the capture location each of the target images 41a, 41b, 41c, and 41d selected in step S100. In addition, although the face can be detected from some of the target images 41a, 41b, 41c, and 41d, the face cannot be detected from another image in some cases.

In consideration of such circumstances, the TP selection unit 13 may specify one or more main images based on the feature information of each image from the target images, and may select the first template and the second template from the plurality of templates based on the main image. The TP selection unit 13 can specify the main image as follows.

The TP selection unit 13 performs the face recognition for the target image, and sets the target image obtained by succeeding the detection of the face as the main image. However, in a case where the face is detected from a plurality of the target images among the target images, the TP selection unit 13 may perform judgment (so-called smile judgment or the like) relating to the size of the face, the direction of the face, the expressing of the face, and the like, and specify the target image including a face with better appearance based on a predetermined criterion as the main image, among the target image obtained by the detection of the face.

In addition, in a case where the face cannot be detected from any target image as a result of the face recognition for the target image, the TP selection unit 13 divides the target image into a group (feature similarity group) having similar feature information such as the capture date and time and the capture location. Then, the target image of a group having the largest number of image after the division into such a feature similarity group, is specified as the main image. For example, if the target images 41a, 41b, and 41c among the target images 41a, 41b, 41c, and 41d are images captured during a period from March to April (spring), and the target image 41d is an image captured during a period of August (summer), the first feature similarity group (target images 41a, 41b, and 41c) among the first feature similarity group (target images 41a, 41b, and 41c) and the second feature similarity group (target image 41d) is specified as the main image. After specifying the main image from the target images, the TP selection unit 13 selects the plurality of templates from the templates stored in the above-described storage unit 19 based on the feature information of the main image.

In such a step S110, in a process in which the TP selection unit 13 selects two or more templates from the plurality of templates stored in the storage unit 19 based on the target image, a process in which the template is generated from a plurality of materials stored in the storage unit 19 based on the target image, is included. The term "material" as used herein refers to patterns, illustrations, characters, stamps, messages, or the like related to seasons, landscapes, events, or the like in addition to the template having only the arrangement area. That is, the TP selection unit 13 may dynamically generate the plurality of templates subjected to design, and may handle the plurality of the generated templates as the plurality of templates selected from the storage unit 19, by laying out materials such as patterns, illustrations, characters, stamps, messages, or the like into various templates (templates having only arrangement area) corresponding to a capture time or the capture location, based on the feature information of the target image (or main image).

In step S120, the control unit 11 (arrangement unit 14) generates the plurality of templates (post-synthesis template) after the arrangement of the target image by arranging each target image on each arrangement area in each of the templates selected in step S110, (arrangement process). In a process of step S120, a process in which the target image is arranged on the arrangement area of the first template, and the target image is arranged on the arrangement area of the second template is included. In step S120, in the arrangement process of the target image for the arrangement area of the template, the arrangement unit 14 may arrange the target image appropriately by scaling or the like such that the target image is included as much as possible inside the arrangement area, and there is no need to strictly determine a relative positional relationship and a size ratio between the arrangement area and the target image. This is because the user can arbitrarily perform fine adjustment in step S140 (edit process) (which will be described below).

In addition, in step S120, the arrangement unit 14 can simply determine correspondence relationship between the target image and the arrangement area in the template. For example, in the template, it is assumed that numbers are allocated in advance on the arrangement area within the template. Then, when the plurality of the target images are arranged on a plurality of the arrangement areas in the template, the arrangement unit 14 may arrange the target images by associating, for example, the order of the capture date and time with the order of the arrangement area of numbers 1, 2, 3, . . . . However, in a case where there is the difference of the size of the arrangement area in the template or the like, the arrangement unit 14 may determine the correspondence relationship with the arrangement area in the template according to the feature of the target image. For example, the arrangement unit 14 can cause the main image (any one of main images) as described above to be arranged on the arrangement area having the largest area among the plurality of the arrangement areas included in the template.

In step S130, the control unit 11 (display control unit 15) causes a plurality of the post-synthesis templates generated in step S120 to be displayed on the display unit 17 (display control process). The process of step S130 includes a process of causing the first template after the arrangement of the target images and the second template after the arrangement of the target images to be displayed on the display unit 17.

Figure 4:
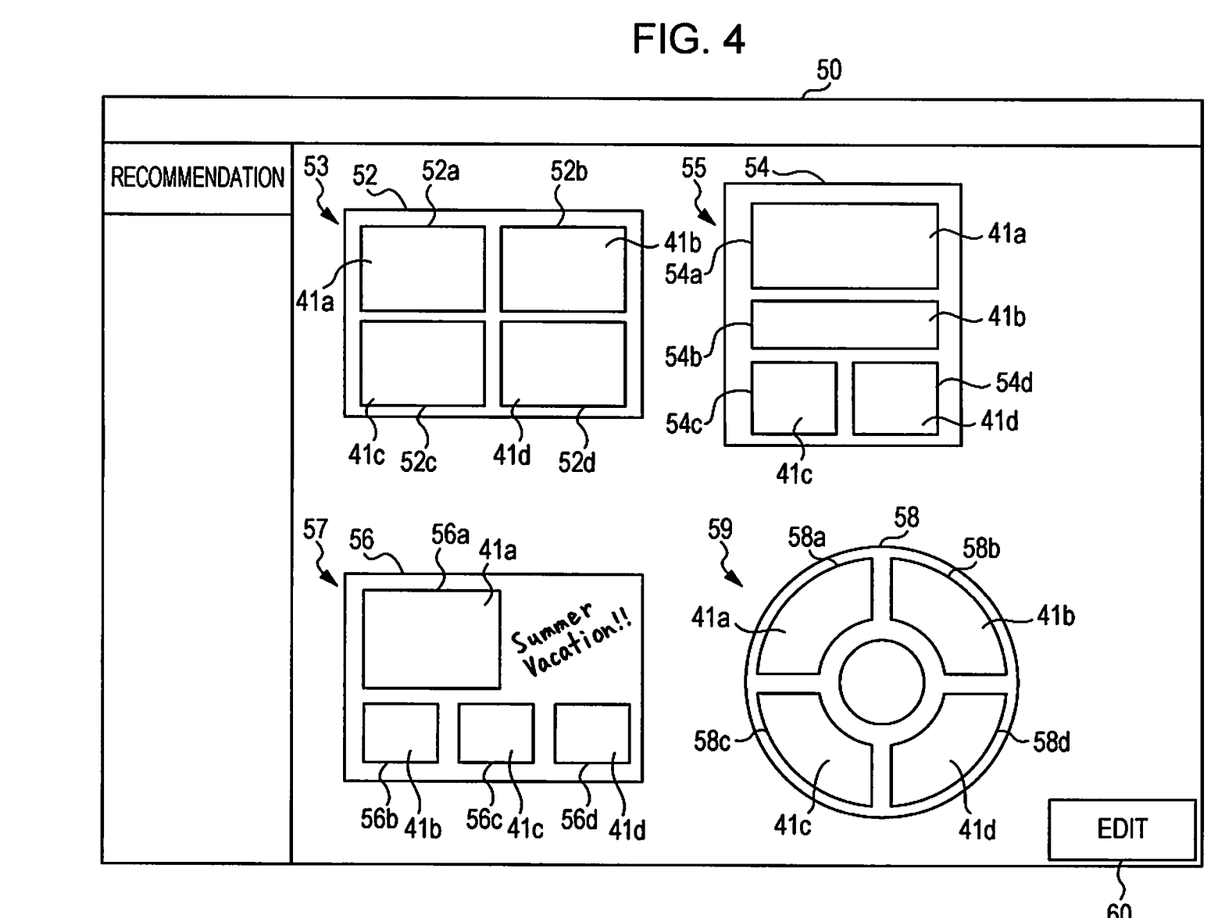
FIG. 4 is a diagram illustrating an example of a template selection screen after synthesis.

FIG. 4 illustrates an example of a post-synthesis template selection screen 50 displayed on the display unit 17 by the display control unit 15. That is, from the user's point of view, by simply operating a button 42 in a state where one or more images are selected on the image selection screen 40 (FIG. 3), display content on the display unit 17 transitions from the image selection screen 40 to the post-synthesis template selection screen 50. The plurality of the post-synthesis templates 53, 55, 57, 59, . . . generated in step S120 are displayed on the post-synthesis template selection screen 50. The post-synthesis template 53 is an image obtained as a result of arranging the target images 41a, 41b, 41c, and 41d on a template 52 selected in step S110. Specifically, the template 52 includes the four arrangement areas 52a, 52b, 52c, and 52d, and the target images 41a, 41b, 41c, and 41d are arranged on the arrangement areas 52a, 52b, 52c, and 52d, respectively.

The post-synthesis template 55 is an image of a result obtained by arranging the target images 41a, 41b, 41c, and 41d on a template 54 selected in step S110. The template 54 includes the four arrangement areas 54a, 54b, 54c, and 54d, and the target images 41a, 41b, 41c, and 41d are arranged on the arrangement areas 54a, 54b, 54c, and 54d, respectively. The post-synthesis template 57 is an image of a result obtained by arranging the target images 41a, 41b, 41c, and 41d on a template 56 selected in step S110. The template 56 includes the four arrangement areas 56a, 56b, 56c, and 56d, and the target images 41a, 41b, 41c, and 41d are arranged on the arrangement areas 56a, 56b, 56c, and 56d, respectively. The post-synthesis template 59 is an image of a result obtained by arranging the target images 41a, 41b, 41c, and 41d on a template 58 selected in step S110. The template 58 includes the four arrangement areas 58a, 58b, 58c, and 58d, and the target images 41a, 41b, 41c, and 41d are arranged on the arrangement areas 58a, 58b, 58c, and 58d, respectively.

In FIG. 4, although only four types of the post-synthesis template are illustrated due to space limitations, on the post-synthesis template selection screen 50, more post-synthesis template than those can be displayed by scrolling the screen 50 or the like. In addition, in FIG. 4, although descriptions of most of designs such as patterns, illustrations, characters, stamps, and messages applied to the templates 52, 54, 56, and 58, are omitted, on the actual post-synthesis template selection screen 50, the design of each of the template 52, 54, 56, and 58 is also displayed together with the target images 41*a*, 41*b*, 41*c*, and 41*d*.

As can be seen from an example of FIG. 4, in step S130, the plurality of the post-synthesis templates 53, 55, 57, and 59 in which the target images 41*a*, 41*b*, 41*c*, and 41*d* are commonly arranged in each of different templates 52, 54, 56, and 58 are displayed on the display unit 17. In addition, the post-synthesis templates 53, 55, and 57 illustrated in FIG. 4 are templates obtained by arranging the target images on the horizontally long or vertically long templates 52, 54, and 56, and indicates images printed on a rectangular print medium such as a postcard. Meanwhile, the post-synthesis template 59 is obtained by arranging the target image in a circular template 58 having a hole in the center, and indicates an image to be printed on a label surface (kind of print medium) of a disc such as a CD and a DVD. That is, it is displayed that the plurality of templates corresponding to various print medium shapes are selected according to the target image in step S110 and the plurality of the post-synthesis templates in which a common target image is arranged for these various templates, are generated in step S120 and S130.

In step S130, after the plurality of the post-synthesis templates are displayed on the display unit 17, the control unit 11 performs the edit process of the post-synthesis template (step S140). However, since the edit process is a process performed in accordance with an operation of the user, the edit may be not performed as a result. By operating the operation receiving unit 18, in a state where the post-synthesis template displayed on the post-synthesis template selection screen 50 is selected one by one, the user operates a predetermined button (edit button) 60 provided on the post-synthesis template selection screen 50 such that it is possible to make the transition of the selected post-synthesis template on the edit screen 70 for the post-synthesis template selection screen 50.

Figure 5:
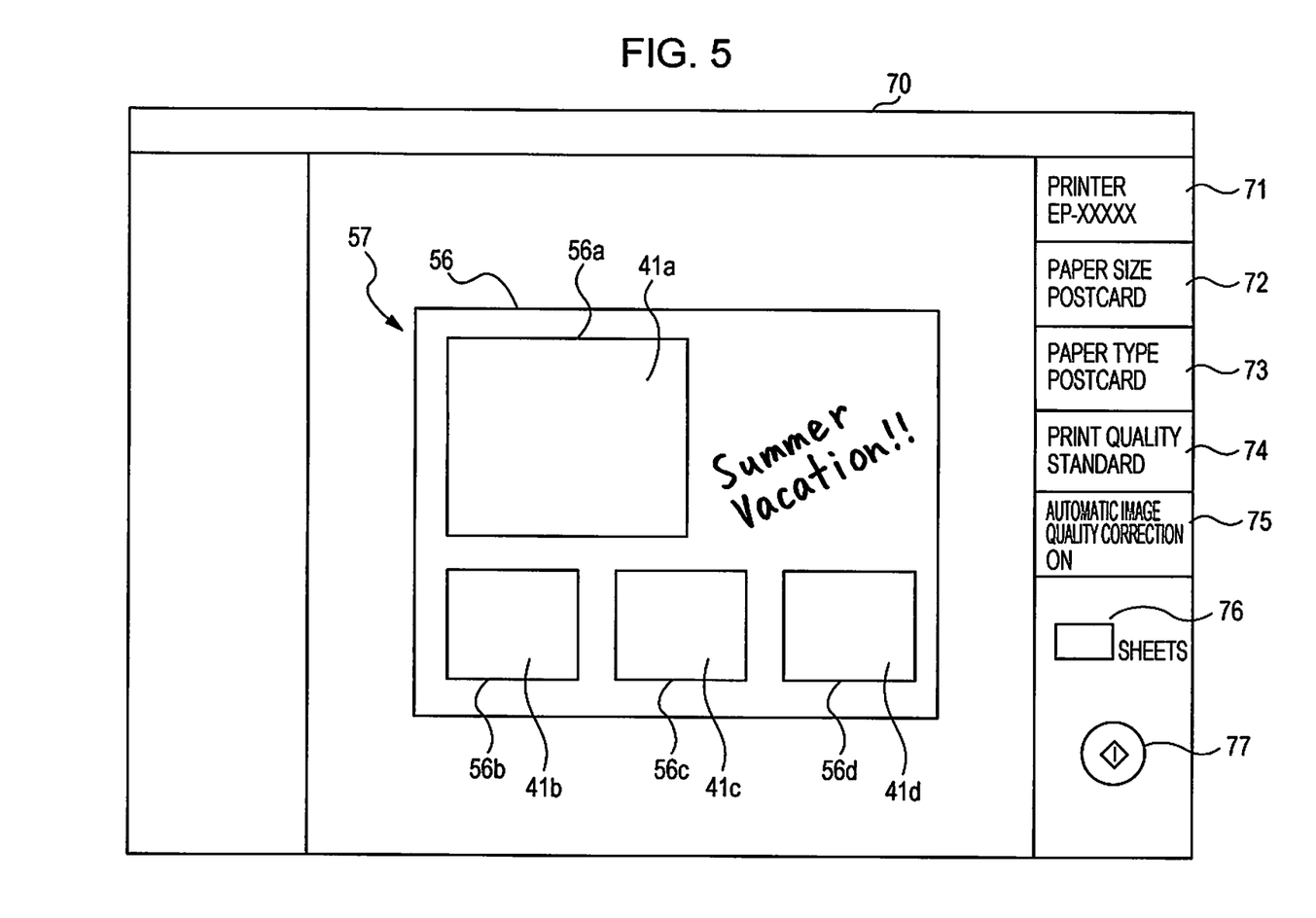
FIG. 5 is a diagram illustrating an example of an edit screen.

FIG. 5 illustrates an example in which the display control unit 15 causes the edit screen 70 to be displayed on the display unit 17. FIG. 5 is an edit screen for the post-synthesis template 57 on the post-synthesis template selection screen 50. On the edit screen 70, the post-synthesis template of an edit target is enlarged and displayed as compared to a case where the template is displayed on the post-synthesis template selection screen 50. The control unit 11 performs editing on the post-synthesis template according to an operation on an arbitrary operation receiving unit 18 by the user on the edit screen 70 (step S140). Here, the editing is, for example, enlargement/reduction, trimming, rotation, and rearrangement (for example, rearrangement such as switching of positions of target image 41*a* and target image 41*b*) of the target images 41*a*, 41*b*, 41*c*, and 41*d* arranged on the arrangement areas 56*a*, 56*b*, 56*c*, and 56*d* of the post-synthesis template 57. In addition, the change of the target image currently arranged on the post-synthesis template 57 to another image, or addition, deletion, movement, or the like of materials (patterns, illustrations, characters, stamps, messages, or the like designed on template 56) is also a type of the editing.

On the edit screen 70, print setting fields 71, 72, 73, 74, 75, and 76 for receiving various settings such as a printer (print unit 30) for performing printing, a print medium size (paper size), a print medium type (paper type), print quality, selection of whether to activate automatic image quality correction by a program A, and the number of print are provided. By arbitrarily operating the print setting fields 71, 72, 73, 74, 75, and 76 via the operation receiving unit 18, the user can set desired print settings.

In addition, a print button 77 is provided on the edit screen 70. By operating the print button 77 via the operation receiving unit 18, the user prints the post-synthesis template currently displayed on the edit screen 70. That is, the control unit 11 (print control unit 16) transmits the post-synthesis template (in state where editing is performed, post-synthesis template to which latest editing is applied) currently displayed on the edit screen 70 according to the detection of pressing of the print button 77 to the print unit 30 (printer set in print setting field 71) such that the post-synthesis template is printed on the print unit 30 (step S150).

In a print process in step S150, the print control unit 16 converts the image data as the post-synthesis template transmitted to the print unit 30 into data (print data) in a known format which can be interpreted by the print unit 30, and transmits the print data after the conversion together with various formats (command indicating print setting set in print setting fields 71, 72, 73, 74, 75, 76, and the like) to the print unit 30. With this, in a print unit 30 side, the post-synthesis template based on the print data and the command is printed on the print medium. The print control unit 16 transmits the post-synthesis template selected by the user from the post-synthesis template (plurality of post-synthesis templates displayed on post-synthesis template selection screen 50) displayed on the display unit 17 to the print unit 30 such that the template is printed on the print unit 30.

According to the present embodiment, the control unit 11 of the display device 10 selects the plurality of templates for arranging the target image from the plurality of the stored templates based on the target image arbitrarily selected by the user (step S110). Then, the target image is arranged on each of the plurality of the selected templates (plurality of templates at least including first template and second template) (step S120), and the plurality of templates (post-synthesis template) after arranging the target image are displayed on the display unit 17 (step S130). With this, the user can compare the plurality of the post-synthesis templates (see FIG. 4) with different designs on which the selected target images (for example, target images 41*a*, 41*b*, 41*c*, and 41*d*) are arranged on the display unit 17 at a time, and can easily select an appropriate template (determined that it is appropriate by user) for arranging the target image. In the related art, since a desired template is finally specified by switching the templates for arranging the selected image one by one and previewing them, the user's burden is great. According to the present embodiment, it is possible to greatly reduce the user's burden required for selecting such a preferable template.

In addition, according to the present embodiment, the control unit 11 selects the plurality of templates corresponding to the arrangement of the target image from the plurality of the stored templates based on various types of the feature information such as the capture date and time, the capture location of the target image, and a result of the face recognition (step S110). With this, it can be mentioned that the plurality of the post-synthesis templates (see FIG. 4) to be displayed on the display unit 17 is already designed in accordance with the content of the target image, and the user can easily select the post-synthesis template with high satisfaction.

In addition, according to the present embodiment, the control unit 11 can specify the main image based on the feature information from the target images, and select the plurality of templates from the plurality of the stored templates based on the main image (step S110). With this, even in a case where the features of the target image are not necessarily unified, a solution for the control unit 11 to select an appropriate template in accordance with the target image as much as possible is given.

3. Modification Examples

The present embodiment is not limited to the above-described embodiment, and may include, for example, various modification examples as described below.

Modification Example 1

Figure 6:
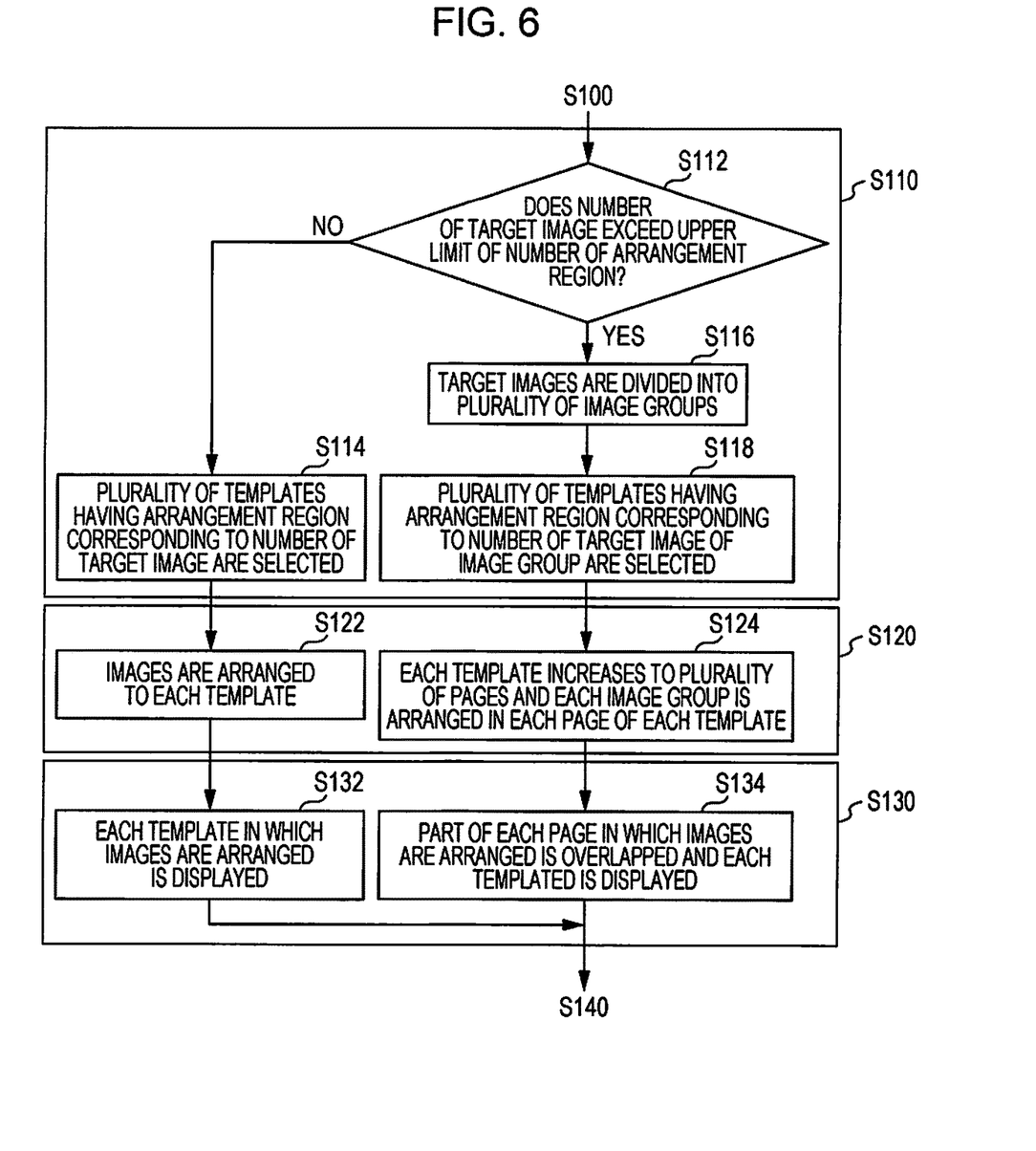
FIG. 6 is a flowchart illustrating a process according to a modification example 1.

FIG. 6 illustrates a process according to a modification example 1 by a flowchart. The flowchart in FIG. 6 is a modification example in steps S110 to S130 of FIG. 2.

According to FIG. 6, step S110 includes steps S112, S114, S116, and S118. First, in step S112, the TP selection unit 13 determines whether or not the number of the target image selected in step S100 exceeds the upper limit of the number of the arrangement area in the template. In the control unit 11, the upper limit of the number of the arrangement area which can be included in the template is set. In other words, in the storage unit 19, the template having the arrangement area of the number exceeding the upper limit is not stored. It is assumed that the upper limit can take various values, for example, 10. If the number of the target image is equal to or less than the upper limit ("No" in step S112), the TP selection unit 13 proceeds the process to step S114. Meanwhile, if the number of the target image exceeds the upper limit ("Yes" in step S112), the TP selection unit 13 proceeds the process to step S116.

In step S114, the TP selection unit 13 selects the plurality of templates having the arrangement area corresponding to the number of the target image from the templates stored in the storage unit 19. In this case, the TP selection unit 13 selects the template based on the feature information of the target image (or main image) described above. As can be seen from FIG. 6, after it is determined as "No" in step S112, processes of steps S114 (template selection process), S122 (arrangement process), and S132 (display control process) are continued. Since a flow of steps S114, S122, and S132 is substantially the same as the above-described embodiment, that is, steps S110, S120, and S130 already described with reference to FIGS. 2, 4, and the like, further explanation is omitted.

Meanwhile, the processes (steps S112, S116, S118, S124, and S134) of a case where it is determined as "Yes" in step S112 are the main contents of the modification example.

In step S116, the TP selection unit 13 divides the target image into a plurality of image groups composed of images of a number equal to or less than the upper limit of the number of the arrangement area in the template. At this time, the TP selection unit 13 processes the number of the image for each image group as uniform as possible. Here, the image group is irrelevant to the feature similarity group for specifying the above-described main image. As a specific example, in a case where the number of the target image selected in step S100 is 12 and the upper limit is 10, the TP selection unit 13 causes 12 target images to be divided into two image groups (first image group and second image group) composed of six target images.

In step S118, the TP selection unit 13 selects the plurality of templates having the arrangement area corresponding to the number of the target image for each image group from the templates stored in the storage unit 19 (template selection process). As a specific example, if the number of the target image selected in step S100 is 12 and the number of the target image for each image group according to the division in step S116 is six, the TP selection unit 13 selects the plurality of templates having six arrangement areas. Of course, also in this case, the TP selection unit 13 selects the template based on the feature information of the target image (or main image) as described above. In a case where the number of the target image for each image group according to the division in step S116 is not uniform as, for example, the first image group is six and the second image group is five, the TP selection unit 13 selects the plurality of templates having the arrangement areas of a number corresponding to the maximum value of the number of the target image for each image group from the templates stored in the storage unit 19.

In step S124, the arrangement unit 14 sets a plurality of pages on each template selected in step S118, and arranges the target image of each image group on each page of each template (arrangement process). That is, the arrangement unit 14 increases each template selected in step S118 to a plurality of pages.

Figure 7:
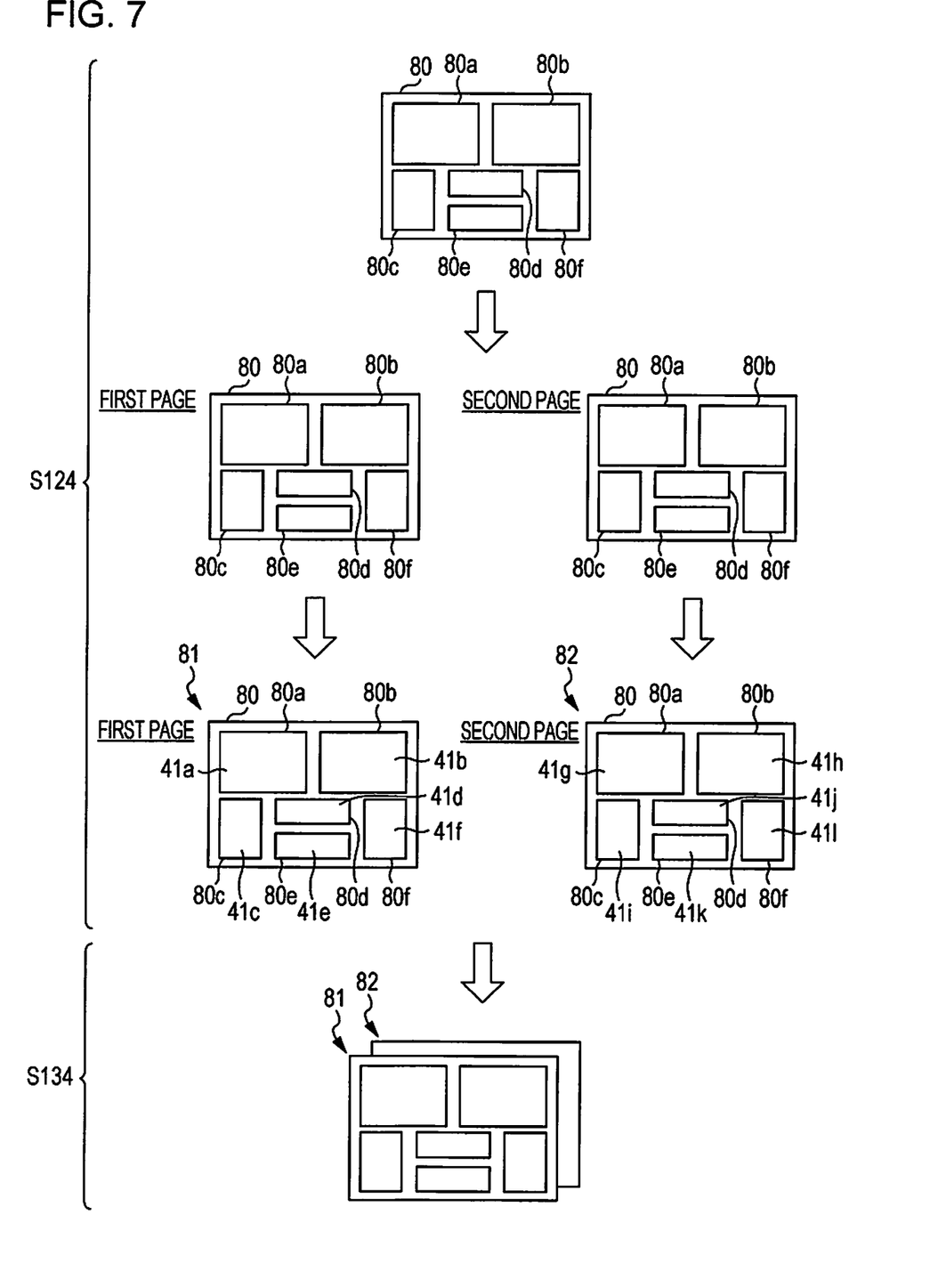
FIG. 7 is a diagram specifically illustrating processes of steps.

FIG. 7 is a diagram for specifically explaining the processes of steps S124 and S134. The template 80 illustrated in FIG. 7 is one (for example, first template) of the plurality of templates selected in step S118. In addition, as a premise to explain FIG. 7, the number of the target image selected in step S100 is 12 and the number of the target image for each image group according to the division in step S116 is six. As a result, in step S118, it is assumed that the plurality of templates (for example, template 80) having six arrangement areas are selected. In addition, it is assumed that twelve target images selected in step S100 are referred to as the target images 41a, 41b, 41c, 41d, 41e, 41f, 41g, 41h, 41i, 41j, 41k, and 41l, and these target images are divided into the first image group of the target images 41a, 41b, 41c, 41d, 41e, and 41f and the second image group of the target images 41g, 41h, 41i, 41j, 41k, and 41l in step S116.

According to FIG. 7, the template 80 includes six arrangement areas 80a, 80b, 80c, 80d, 80e, and 80f. The arrangement unit 14 increases the number of the template 80 to the same number of the page as the number of the image group obtained by the division in step S116, in step S124. In step S116, since twelve target images are divided into two image groups (first image group and second image group) composed of six target images, the arrangement unit 14 increases the page of the template 80 to total two pages (number of page of template 80 is set to two pages). The increase of the page of the template is performed by simply copying the template. A result of copying the template 80 of the first page illustrated in the second row from the top of FIG. 7 is the template 80 of the second page illustrated in the second row.

Furthermore, the arrangement unit 14 arranges the target image for each image group obtained by the division on each page (first page and second page) of the template 80 in step S124. According to an example of FIG. 7, the arrangement unit 14 causes the target images 41a, 41b, 41c, 41d, 41e, and 41f of the first image group to be arranged on the arrangement areas 80a, 80b, 80c, 80d, 80e, and 80f in the template 80 of the first page, and causes the target images 41g, 41h, 41i, 41j, 41k, and 41l of the second image group to be arranged on the arrangement areas 80a, 80b, 80c, 80d, 80e, and 80f in the template 80 of the second page. It is assumed that images of a result obtained by arranging the target images 41*a*, 41*b*, 41*c*, 41*d*, 41*e*, and 41*f* of the first image group on the template 80 of the first page are referred to as a post-synthesis template 81, and images of a result obtained by arranging the target images 41*g*, 41*h*, 41*i*, 41*j*, 41*k*, and 41*l* of the second image group on the template 80 of the second page are referred to as a post-synthesis template 82.

In step S134 (FIG. 6), the display control unit 15 causes the template of each page after the arrangement of the target image, that is, the post-synthesis template of the plurality of pages using the same template to be displayed on the display unit 17 in a state where the template is partially overlapped with each other (display control process). According to an example of FIG. 7, the display control unit 15 sets the template obtained by partially overlapping a part of the post-synthesis template 81 of the first page with a part of the post-synthesis template 82 of the second page using the same template 80, as a group of the post-synthesis template, and causes the overlapped template to be displayed on the display unit 17. In FIG. 7, only one process for the template 80 among the plurality of templates selected in step S118, is described. However, needless to say, a process illustrated in FIG. 7 is performed in the same manner with respect to each template selected in step S118. Accordingly, in step S134, on the post-synthesis template selection screen 50 of the display unit 17, a group of the post-synthesis template as exemplified at the bottom of FIG. 7 is displayed (arranged side by side on the same screen 50) in accordance with each of the templates selected in step S118.

According to such steps S124 and S134, it can be mentioned that the arrangement unit 14 sets the plurality of pages for each template selected based on the target image, and arranges the target images to be divided to the plurality of pages for each selected template, and the display control unit 15 causes the display unit 17 to display each of the selected templates in a state where a part of each of the plurality of pages (for example, post-synthesis templates 81 and 82) after arrangement of the image is overlapped.

In addition, the display control unit 15 causes a display page (frontmost page) to be switched in one group of the post-synthesis template according to an operation of the user. For example, as illustrated in the bottom row of FIG. 7, the post-synthesis template 81 among the post-synthesis templates 81 and 82 configuring one group in one group of the post-synthesis template is displayed as the front-most surface. In this case, when clicking or the like an edge of a page (post-synthesis template 82) other than the front-most surface (post-synthesis template 81) on the post-synthesis template selection screen 50 by operating the operation receiving unit 18 by the user, the display control unit 15 causes a page (post-synthesis template 82) that is clicked to be displayed on the front-most surface in one group of the post-synthesis template. With this, the user can easily see each of the post-synthesis templates of which parts are overlapped with each other.

According to such a modification example 1, in a case where the number of the target image arbitrarily selected by the user exceeds the upper limit of the number of the arrangement area in the template, the control unit 11 copies each template selected based on the target image and increases the template to the plurality of pages. Then, the target image is divided and arranged on the plurality of pages for each template, and the plurality of pages (post-synthesis template) after the arrangement are partially overlapped with each other on the same template such that the overlapped result is displayed on the display unit 17. Therefore, the user can check a state of being arranged on a common template (for example, template 80) for the entirety of the target image, or compare different templates on which common target images (for example, target images 41*a*, 41*b*, 41*c*, 41*d*, 41*e*, 41*f*, 41*g*, 41*h*, 41*i*, 41*j*, 41*k*, and 41*l*) are arranged. With this, the user can comfortably and easily perform an arbitrary edit process and a print process after step S134 (step S130). In a case where an edit button 60 is pressed down by selecting one group of the post-synthesis templates exemplified in the bottom row of FIG. 7 on the post-synthesis template selection screen 50 and a target of the print process by the pressing of the print button 77 on the edit screen 70 is selected, each of the post-synthesis template 81 and the post-synthesis template 82 is printed on the print medium by the print unit 30.

Modification Example 2

The display control unit 15 may display the template selected by the user from the post-synthesis templates displayed on the display unit 17 with a size greater than that of other templates on the display unit 17 in step S130 (FIGS. 2 and 6).

Figure 8:
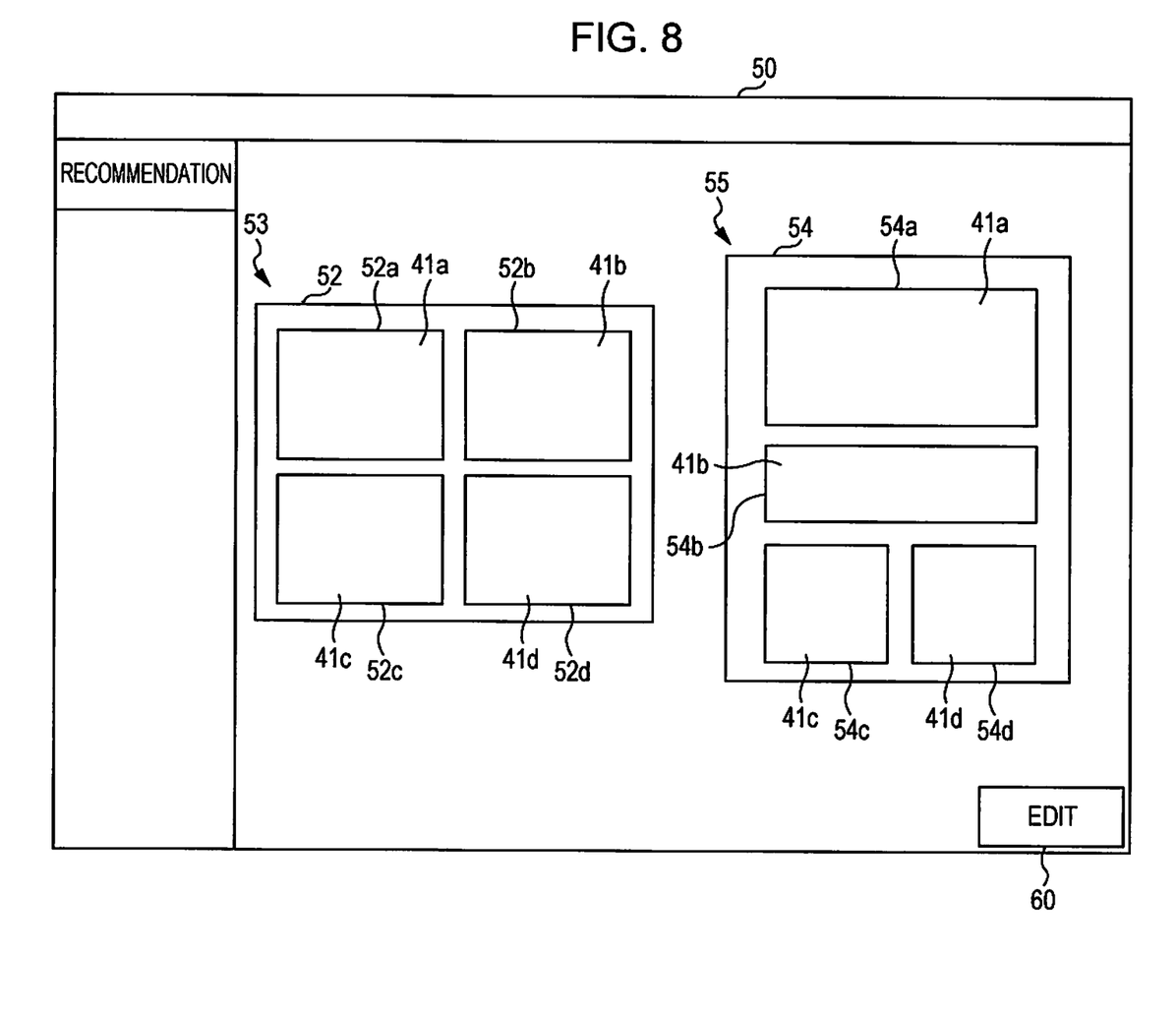
FIG. 8 is a diagram illustrating another example of the template selection screen after synthesis.

FIG. 8 illustrates another example of the post-synthesis template selection screen 50 displayed on the display unit 17 by the display control unit 15. On the post-synthesis template selection screen 50 illustrated in FIG. 4, the user selects a part of the post-synthesis template (for example, post-synthesis templates 53 and 55) by operating the operation receiving unit 18. Here, the selection is a selection not accompanied by the pressing of the edit button 60, and a selection by a predetermined operation (for example, drag operation of cursor on post-synthesis template selection screen 50). The display control unit 15 transitions the post-synthesis template selection screen 50 (FIG. 4) to the post-synthesis template selection screen 50 illustrated in FIG. 8 according to the selection. On the post-synthesis template selection screen 50 of FIG. 8, a part of the post-synthesis template (post-synthesis templates 53 and 55) selected by the user enlarged and displayed. According to such a modification example 2, the template (for example, post-synthesis templates 53 and 55) selected by the user among the post-synthesis templates displayed on the display unit 17 is displayed with a size greater than that of other templates (templates not selected by user among post-synthesis templates displayed on display unit 17, for example, post-synthesis templates 57 and 59), and the template can be presented to the user in a more easily viewable state.

The entire disclosure of Japanese Patent Application No. 2017-199692, filed Oct. 13, 2017 is expressly incorporated by reference herein.

What is claimed is:
1. A display device comprising:
 a processor configured to execute a plurality of units including
  an image selection unit that selects a plurality of images to be processed,
  a template selection unit that selects a first template from the plurality of templates including an arrangement area and stored in a storage, based on the selected images,
  an arrangement unit that arranges the selected images on the arrangement area of the first template, and
  a display control unit that causes a display unit to display the first template after the arrangement of the images, the arrangement unit further setting a first page of the selected first template and a second page of the selected first template, and arranging at least one of the selected images on the arrangement area of the first page of the first template and arranging at least a different one of the selected images on the arrangement area of the second page of the first template, the different one of the selected images being different from the one of the selected images, and the display control unit causing the display unit to display the first page of the first template and the second page of the first template in a state where a part of the second page of the first template overlaps with the first page of the first template.

2. The display device according to claim 1, wherein the template selection unit selects the first template from the plurality of templates, based on feature information of the images including at least one of a capture date and time and a capture location of each of the selected images.

3. The display device according to claim 1, wherein the template selection unit specifies one or more main images from the selected images based on the feature information for each image, and selects the first template from the plurality of templates based on the main image.

4. The display device according to claim 1, wherein the template selection unit further selects a second template from the plurality of templates based on the selected images, the arrangement unit further arranges the selected images on an arrangement area of the second template, and the display control unit further causes the display unit to display the second template after the arrangement of the images.

5. The display device according to claim 4, wherein the arrangement unit further sets a plurality of pages in the selected second template and arranges the selected images to be divided into the plurality of pages for the selected second template, and the display control unit further causes the display unit to display the selected second template in a state where parts of the plurality of pages after the arrangement of the images are overlapped.

6. The display device according to claim 4, wherein the display control unit causes the display unit to display a selected template selected by a user from the templates after the arrangement of the images displayed on the display unit, in a size greater than that of a different template different from the selected template.

7. The display device according to claim 1, wherein the processor is configured to further execute a print control unit that transmits the first template selected by the user from the templates after the arrangement of the images displayed on the display unit to a print unit and causes the print unit to print the first template.

8. A display method comprising:
selecting a plurality of images to be processed;
selecting a first template based on the selected images from a plurality of templates including an arrangement area and stored in a storage;
arranging the selected images on the arrangement area of the first template; and
causing a display unit to display the first template after the arrangement of the images,
in the arranging, a first page of the selected first template and a second page of the selected first template being set, at least one of the selected images being arranged on the arrangement area of the first page of the first template and at least a different one of the selected images being arranged on the arrangement area of the second page of the first template, the different one of the selected images being different from the one of the selected images, and
in the causing of the display unit to display the first template, the display unit being caused to display the first page of the first template and the second page of the first template in a state where a part of the second page of the first template overlaps with the first page of the first template.

9. A non-transitory computer-readable recording medium for storing a display program causing a computer to perform:
an image selection function for selecting a plurality of images to be processed;
a template selection function for selecting a first template based on the selected images from a plurality of templates including an arrangement area and stored in a storage;
an arrangement function for arranging the selected images on the arrangement area of the first template; and
a display control function for causing a display unit to display the first template after the arrangement of the images,
in the arranging, a first page of the selected first template and a second page of the selected first template being set, at least one of the selected images being arranged on the arrangement area of the first page of the first template and at least a different one of the selected images being arranged on the arrangement area of the second page of the first template, the different one of the selected images being different from the one of the selected images, and
in the causing of the display unit to display the first template, the display unit being caused to display the first page of the first template and the second page of the first template in a state where a part of the second page of the first template overlaps with the first page of the first template.

* * * * *